(12) United States Patent
Dai et al.

(10) Patent No.: US 12,508,111 B2
(45) Date of Patent: Dec. 30, 2025

(54) SUPPORT STRUCTURE

(71) Applicant: SHANGHAI SHIFT ELECTRICS CO., LTD., Shanghai (CN)

(72) Inventors: Xiaoguo Dai, Shanghai (CN); Zhenwu Xu, Shanghai (CN)

(73) Assignee: SHANGHAI SHIFT ELECTRICS CO., LTD., Shanghai (CN)

(*) Notice: Subject to any disclaimer, the term of this patent is extended or adjusted under 35 U.S.C. 154(b) by 391 days.

(21) Appl. No.: 18/023,250

(22) PCT Filed: May 14, 2021

(86) PCT No.: PCT/CN2021/093887
§ 371 (c)(1),
(2) Date: Feb. 24, 2023

(87) PCT Pub. No.: WO2022/041853
PCT Pub. Date: Mar. 3, 2022

(65) Prior Publication Data
US 2023/0310117 A1 Oct. 5, 2023

(30) Foreign Application Priority Data
Aug. 27, 2020 (CN) .......................... 202010879992.5

(51) Int. Cl.
*A61C 17/02* (2006.01)
*A61C 17/22* (2006.01)
(Continued)

(52) U.S. Cl.
CPC .............. *A61C 17/02* (2013.01); *A61C 17/34* (2013.01); *A46B 13/02* (2013.01); *A61C 17/22* (2013.01)

(58) Field of Classification Search
CPC ............ A46B 9/04; A61C 17/22; A61C 17/34
See application file for complete search history.

(56) References Cited

U.S. PATENT DOCUMENTS 7,067,945 B2  6/2006  Grez et al.
8,813,330 B2  8/2014  Grez et al.
(Continued)

FOREIGN PATENT DOCUMENTS

BR  112012015279 A2  12/2017
CA     2785087 A1   6/2011
(Continued)

OTHER PUBLICATIONS

European Patent Application No. 21859698.9; Search Report; dated Dec. 4, 2023; 4 pages.
(Continued)

*Primary Examiner* — Michael D Jennings
(74) *Attorney, Agent, or Firm* — BakerHostetler

(57) ABSTRACT

A support structure for supporting a drive shaft that performs reciprocating motion in an electric cleaning care appliance. The support structure comprises an inner fixing ring of the support structure, at least one elastic member of the support structure, and an outer fixing ring of the support structure; the inner fixing ring is fastened on the drive shaft; the outer fixing ring is fastened on an inner wall of a lower device housing; the elastic member is provided between the outer fixing ring and the inner fixing ring; and on the cross section of the elastic member perpendicular to the radial direction of the drive shaft, the width ($b_1$) in the direction perpendicular to a drive force is three times larger than the thickness ($t_1$) in the direction parallel to the drive force.

16 Claims, 10 Drawing Sheets

(51) Int. Cl.
*A61C 17/34* (2006.01)
*A46B 13/02* (2006.01)

(56) References Cited

U.S. PATENT DOCUMENTS

| | | |
|---|---|---|
| 8,875,335 B2 | 11/2014 | Kloster et al. |
| 10,786,338 B2 | 9/2020 | Dai et al. |
| 10,808,810 B2 | 10/2020 | Kramp et al. |
| 2002/0195884 A1 | 12/2002 | Ichii et al. |
| 2003/0204924 A1 | 11/2003 | Grez et al. |
| 2003/0205858 A1 | 11/2003 | Hall et al. |
| 2004/0000016 A1 | 1/2004 | Miller et al. |
| 2004/0010872 A1* | 1/2004 | Chiang ............... A61C 17/34 15/28 |
| 2006/0170293 A1 | 8/2006 | Grez et al. |
| 2009/0019651 A1 | 1/2009 | Grez et al. |
| 2010/0132139 A1 | 6/2010 | Jungnickel et al. |
| 2012/0284937 A1 | 11/2012 | Kloster et al. |
| 2013/0000093 A1 | 1/2013 | Grez et al. |
| 2013/0025079 A1 | 1/2013 | Jungnickel et al. |
| 2013/0207575 A1 | 8/2013 | Bax et al. |
| 2014/0259473 A1 | 9/2014 | Bax et al. |
| 2018/0087631 A1 | 3/2018 | Kramp et al. |
| 2019/0239993 A1 | 8/2019 | Dai et al. |

FOREIGN PATENT DOCUMENTS

| | | |
|---|---|---|
| CA | 3029078 A1 | 1/2018 |
| CA | 2785087 C | 2/2018 |
| CA | 3034787 A1 | 4/2018 |
| CA | 3029078 C | 10/2019 |
| CN | 1346171 A | 4/2002 |
| CN | 1518964 A | 8/2004 |
| CN | 1604999 A | 4/2005 |
| CN | 1662190 A | 8/2005 |
| CN | 1703171 A | 11/2005 |
| CN | 2744317 Y | 12/2005 |
| CN | 2932818 Y | 8/2007 |
| CN | 101541258 A | 9/2009 |
| CN | 101617963 A | 1/2010 |
| CN | 102665603 A | 9/2012 |
| CN | 102665603 B | 5/2015 |
| CN | 106175957 A | 12/2016 |
| CN | 206214221 U | 6/2017 |
| CN | 107205542 A | 9/2017 |
| CN | 106175957 B | 1/2018 |
| CN | 109381276 A | 2/2019 |
| CN | 109789007 A | 5/2019 |
| CN | 213588563 U | 7/2021 |
| EP | 2515793 A2 | 10/2012 |
| EP | 2845566 A2 | 3/2015 |
| EP | 2515793 B1 | 10/2015 |
| EP | 3300685 A1 | 4/2018 |
| EP | 3476364 A1 | 5/2019 |
| EP | 2845566 B1 | 7/2019 |
| EP | 3300685 B1 | 10/2019 |
| EP | 3476364 B1 | 3/2021 |
| GB | 2576343 A * | 2/2020 ........... A61C 1/0092 |
| JP | H03-073105 A | 3/1991 |
| JP | H05-199916 A | 8/1993 |
| JP | 2004-236697 A | 8/2004 |
| JP | 2010-514465 A | 5/2010 |
| JP | 2013-515540 A | 5/2013 |
| JP | 2014-522223 A | 8/2014 |
| JP | 2014-530702 A | 11/2014 |
| JP | 2015-107430 A | 6/2015 |
| JP | 5838167 B2 | 1/2016 |
| JP | 2019-522541 A | 8/2019 |
| JP | 6816169 B2 | 1/2021 |
| RU | 2012131180 A | 1/2014 |
| RU | 2550433 C2 | 5/2015 |
| WO | WO 2003/092535 A2 | 11/2003 |
| WO | WO 2011/077285 A2 | 6/2011 |
| WO | WO 2013/014632 A1 | 1/2013 |
| WO | WO 2013/061196 A2 | 5/2013 |
| WO | WO 2018/000448 A1 | 4/2018 |
| WO | WO 2018/060790 A1 | 4/2018 |

OTHER PUBLICATIONS

International Patent Application No. PCT/CN2021/093887; Int'l Search Report; dated Jul. 26, 2021; 4 pages.

\* cited by examiner

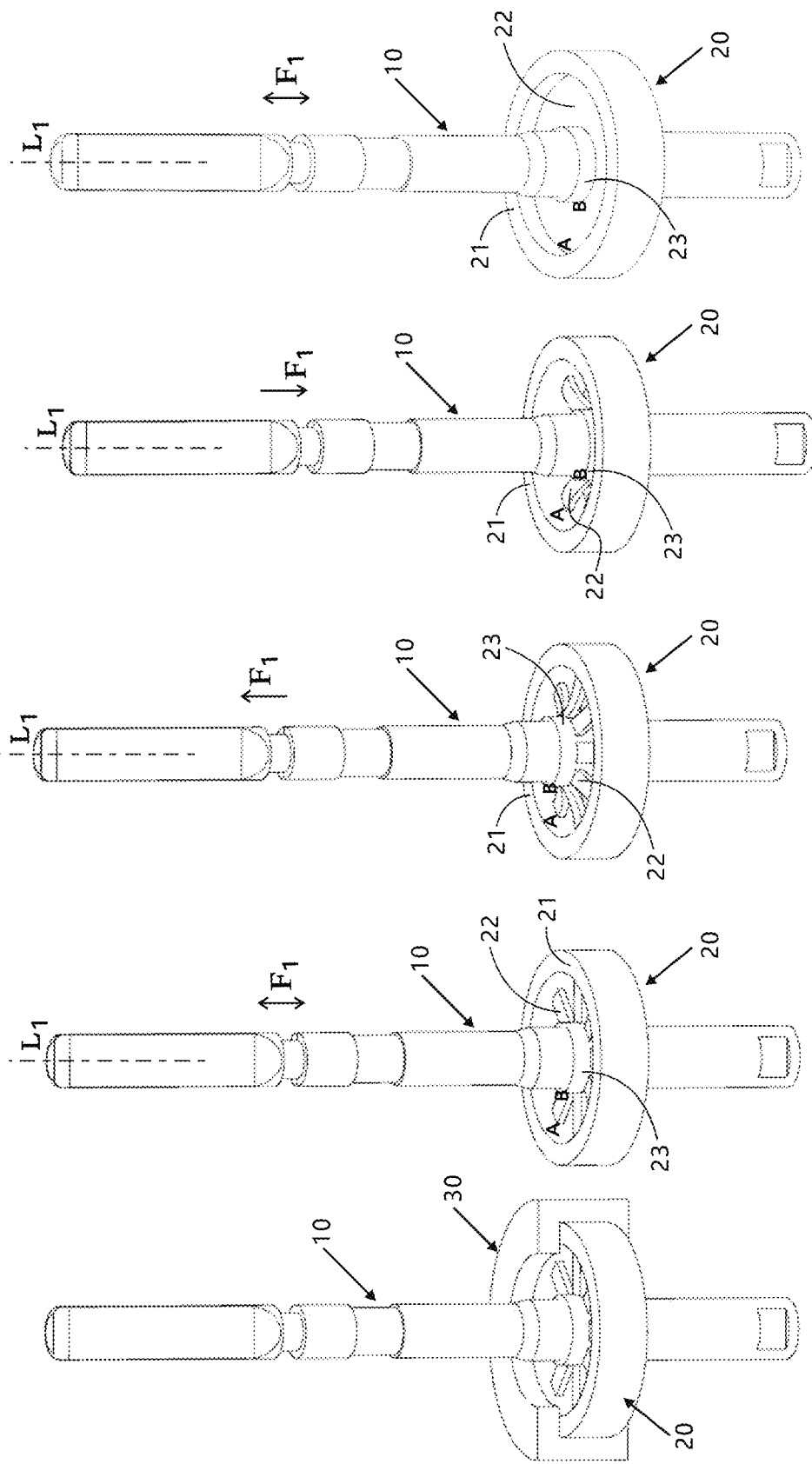

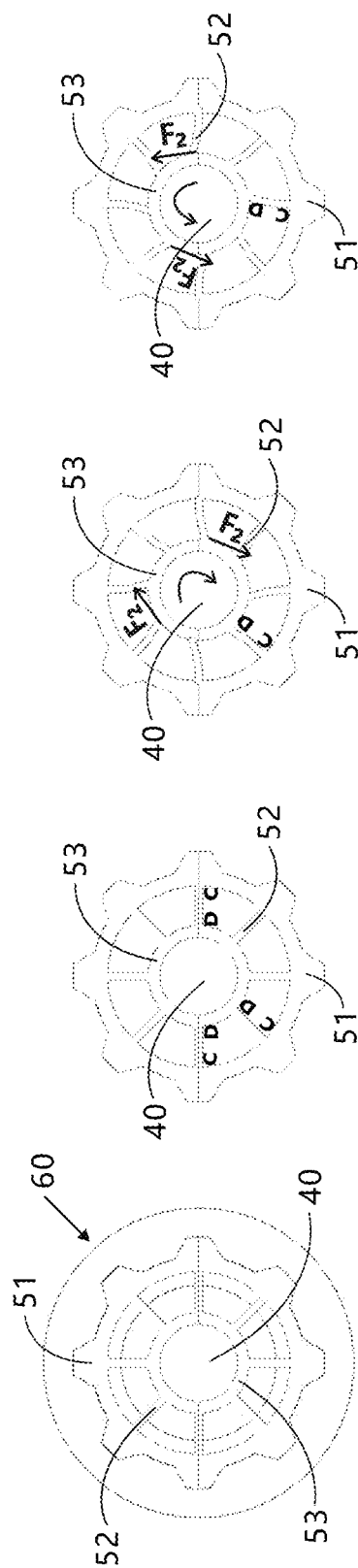

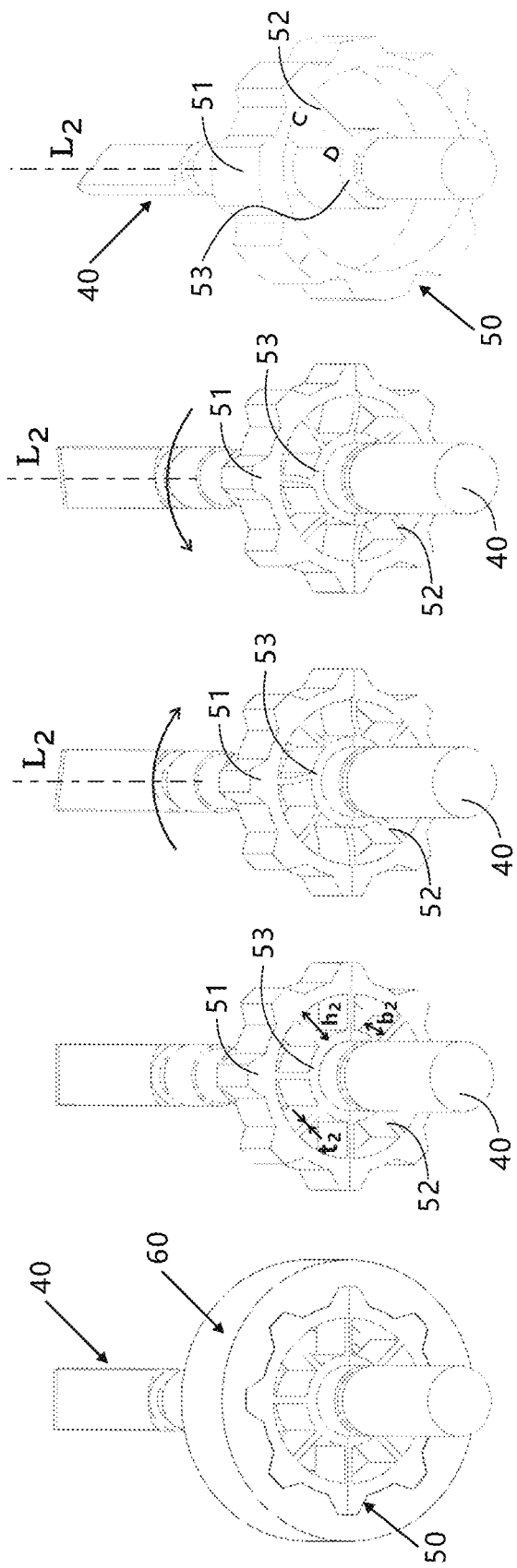

SUPPORT STRUCTURE

CROSS-REFERENCE TO RELATED APPLICATIONS

This application is the National Stage of International Patent Application No. PCT/CN2021/093887, filed on May 14, 2021, which claims priority to Chinese Patent Application No. 202010879992.5, filed on Aug. 27, 2020, the disclosures of which are incorporated herein by reference in their entireties.

TECHNICAL FIELD

The present invention relates to a support structure, and more particularly, to a support structure for supporting a drive shaft that performs reciprocating motion in an electric cleaning care appliance.

BACKGROUND

Typically, a drive shaft that performs reciprocating motion (e.g., reciprocating rotary motion or reciprocating linear motion) needs to be supported by one or more supports to maintain its proper functioning. In the prior art, a shaft-hole matching structure such as a shaft sleeve is commonly used to support the drive shaft, and there is a clearance fit between the drive shaft and the shaft sleeve hole. Such a support structure often has relatively large noise and energy loss. It is also possible to support the drive shaft with bearings. For example, the drive shaft that performs reciprocating rotary motion is supported by ball bearing, and the drive shaft for that performs reciprocating linear motion is supported by linear bearing. However, the cost of bearing support is high.

SUMMARY

The purpose of the present invention is to provide a support structure for supporting a drive shaft that performs reciprocating motion, which has the advantages of low noise, low energy loss, low cost, simple structure, and is suitable for mass production.

In order to achieve the above object, in the present invention, at least a part of the drive shaft is located in the stationary lower device housing, and driven by the drive force, the drive shaft reciprocates relative to the lower device housing along/about its longitudinal axis. A support structure for supporting the drive shaft is also provided in the the lower device housing. A head driven by the drive shaft is also provided in a stationary upper device housing. The transverse axis of the head is substantially perpendicular to the longitudinal axis of the drive shaft, wherein the support structure includes an inner fixing ring of the support structure, at least one elastic member of the support structure and an outer fixing ring of the support structure. The inner fixing ring of the support structure is fastened on the drive shaft along the circumferential direction of the drive shaft. The outer fixing ring of the support structure is directly or indirectly fastened on the inner wall of the lower device housing. The elastic member of the support structure has the performance of a spring, and the elastic member of the support structure is distributed between the outer fixing ring of the support structure and the inner fixing ring of the support structure. The outer end of the elastic member of the support structure is fixedly coupled to the outer fixing ring of the support structure, and the inner end of the elastic member of the support structure is fixedly coupled to the inner fixing ring of the support structure, wherein the width along the direction perpendicular to the drive force, and the thickness parallel to the direction of the drive force is distributed on the cross section of the elastic member of the support structure perpendicular to the radial direction of the drive shaft. The width of the elastic member of the support structure along the direction perpendicular to the drive force is greater than three times the thickness of the elastic member of the support structure along the direction parallel to the drive force.

The outer fixing ring of the support structure, the elastic member of the support structure and the inner fixing ring of the support structure can be made of plastic, preferably thermoplastic, and the inner fixing ring of the support structure and the drive shaft can be injection-molded into an integral piece. The elastic member of the support structure may also be integrally coupled to the inner and outer fixing rings of the support structure.

Preferably, the elastic member of the support structure is arranged such that its length along the radial direction of the drive shaft is greater than three times the thickness of the elastic member in the direction parallel to the drive force on the cross section perpendicular to the radial direction of the drive shaft.

In one embodiment, a thickness of the elastic member of the support structure on the cross section perpendicular to the radial direction of the drive shaft along the direction parallel to the drive force is 0.1 mm-1.3 mm. In another embodiment, a thickness of the elastic member of the support structure on the cross section perpendicular to the radial direction of the drive shaft along the direction parallel to the drive force is 0.2 mm-0.7 mm.

The electric cleaning care appliance of the present invention is preferably an electric toothbrush or a dental irrigator, and the support structure is a linear motion support structure for supporting a drive shaft that performs reciprocating linear motion along the longitudinal axis. Preferably, the distance between the upper surfaces of the inner and outer fixing rings of the linear motion support structure and the head is less than the distance between the upper edge of the elastic member of the linear motion support structure and the head, or the distance between the lower surfaces of the inner and outer fixing rings of the linear motion support structure and the head is greater than the distance between the lower edge of the elastic member of the linear motion support structure and the head, such that the combined linear motion support structure is in a concave shape on at least one side of the upper and lower sides of the cross section parallel to the longitudinal axis of the drive shaft that performs reciprocating linear motion. Preferably, under the action of the drive force of the reciprocating linear motion, the maximum motion amplitude of the drive shaft that performs reciprocating linear motion along its longitudinal axis is less than 3 mm, and more preferably, the maximum motion amplitude is 2 mm.

In yet another embodiment, the electric cleaning care appliance is an electric toothbrush with a drive shaft that performs reciprocating rotary motion about its longitudinal axis, and the support structure is a rotary motion support structure for supporting the drive shaft that performs reciprocating rotary motion. Under the action of the drive force of the reciprocating rotary motion, the inner end of the elastic member of the rotary motion support structure performs a reciprocating bending motion around the outer end of the elastic member of the rotary motion support structure. Preferably, the maximum rotational angle magnitude of the drive shaft that performs reciprocating rotary motion about its longitudinal axis is less than 40 degrees, and more preferably, the maximum rotational angle magnitude is 25 degrees.

In the present invention, due to the reasonable selection for the numeric ratio of the thickness along the direction parallel to the drive force on the cross section of the elastic member of the support structure perpendicular to the radial direction of the drive shaft to the width along the direction perpendicular to the drive force on the cross section, for a drive shaft that performs reciprocating linear motion, the elastic member of the support structure, driven by the drive force of the reciprocating linear motion, not only easily produces bending deformation in response to the reciprocating linear motion of the drive shaft along its longitudinal axis, but also can hinder the rotation of the drive shaft about its longitudinal axis, so as to reliably generate elastic bending deformation in response to the drive force of the drive shaft; and for a drive shaft that performs reciprocating rotary motion, the elastic member of the support structure, driven by the drive force of the reciprocating rotary motion, not only easily produces bending deformation in response to the reciprocating rotary motion of the drive shaft about its longitudinal axis, but also can hinder the motion of the drive shaft along its longitudinal axis, so as to reliably generate elastic bending deformation in response to the drive force of the drive shaft. At the same time, because the drive shaft is coupled to the support structure without gap, the impact and collision on the support structure caused by the reciprocating motion of the drive shaft are avoided, and the noise is greatly reduced. In addition, the conversion energy loss between the elastic potential energy of the elastic member of the support structure and the driving kinetic energy of the drive shaft is very small, so it has the advantages of simple structure, low noise and small energy loss.

BRIEF DESCRIPTION OF THE DRAWINGS

FIG. 2A, FIG. 2B, FIG. 2C, FIG. 2D, FIG. 2E are front views of the reciprocating linear motion combination shown in FIG. 1 in different working states, wherein FIG. 2A shows the situation where the drive shaft that performs reciprocating linear motion is at the origin position (i.e., the middle position) of its linear motion trajectory, and part of a fixture of the reciprocating linear motion support structure can be seen in the figure. FIG. 2B shows that the drive shaft that performs reciprocating linear motion is at the origin position of its linear motion trajectory, and in the figure, the fixture of the reciprocating linear motion support structure is completely disassembled. FIG. 2C shows that the drive shaft for reciprocating linear motion moves upward along its longitudinal axis from the origin position of the motion trajectory shown in FIG. 2B. FIG. 2D shows that the drive shaft for reciprocating linear motion moves downward along its longitudinal axis from the origin position of the motion trajectory shown in FIG. 2B. FIG. 2E shows that there is one elastic member of the linear support structure, and the drive shaft that performs reciprocating linear motion shown in the figure is at its origin position of the linear motion trajectory;

FIG. 3B corresponds to the working state shown in FIG. 2C; FIG. 3C corresponds to the working state shown in FIG. 2D;

FIG. 5A, FIG. 5B, FIG. 5C, FIG. 5D are front views of the reciprocating rotary motion combination shown in FIG. 4 in different working states, wherein FIG. 5A shows that the drive shaft for reciprocating rotary motion installed with the fixture of the reciprocating rotary motion support structure is at the origin position of its rotary motion trajectory. FIG. 5B shows that the drive shaft for reciprocating rotary motion is at the origin position of its rotary motion trajectory, and in the figure, the fixture of the reciprocating rotary motion support structure is completely disassembled. FIG. 5C shows that the drive shaft for reciprocating rotary motion rotates clockwise away from the origin position of the motion trajectory shown in FIG. 5B. FIG. 5D shows that the drive shaft for reciprocating rotary motion rotates counterclockwise away from the origin position of the motion trajectory shown in FIG. 5B;

FIG. 6A, FIG. 6B, FIG. 6C, FIG. 6D are bottom views of the reciprocating rotary motion combination shown in FIG. 5A, FIG. 5B, FIG. 5C, FIG. 5D in a corresponding working state, wherein FIG. 6A corresponds to the working state shown in FIG. 5A; FIG. 6B corresponds to the working state shown in FIG. 5B; FIG. 6C corresponds to the working state shown in FIG. 5C; FIG. 6D corresponds to the working state shown in FIG. 5D;

FIG. 7A to FIG. 7E are perspective views of the reciprocating rotary motion combination shown in FIG. 5A to FIG. 5D in corresponding working states, wherein FIG. 7A corresponds to the working state shown in FIG. 5A; FIG. 7B corresponds to the working state shown in FIG. 5B; FIG. 7C corresponds to the working state shown in FIG. 5C; FIG. 7D corresponds to the working state shown in FIG. 5D; FIG. 7E shows that there is one elastic member of the rotary support structure, and the drive shaft for reciprocating rotary motion shown in the figure is at the origin position of its rotary motion trajectory;

Figure 1:
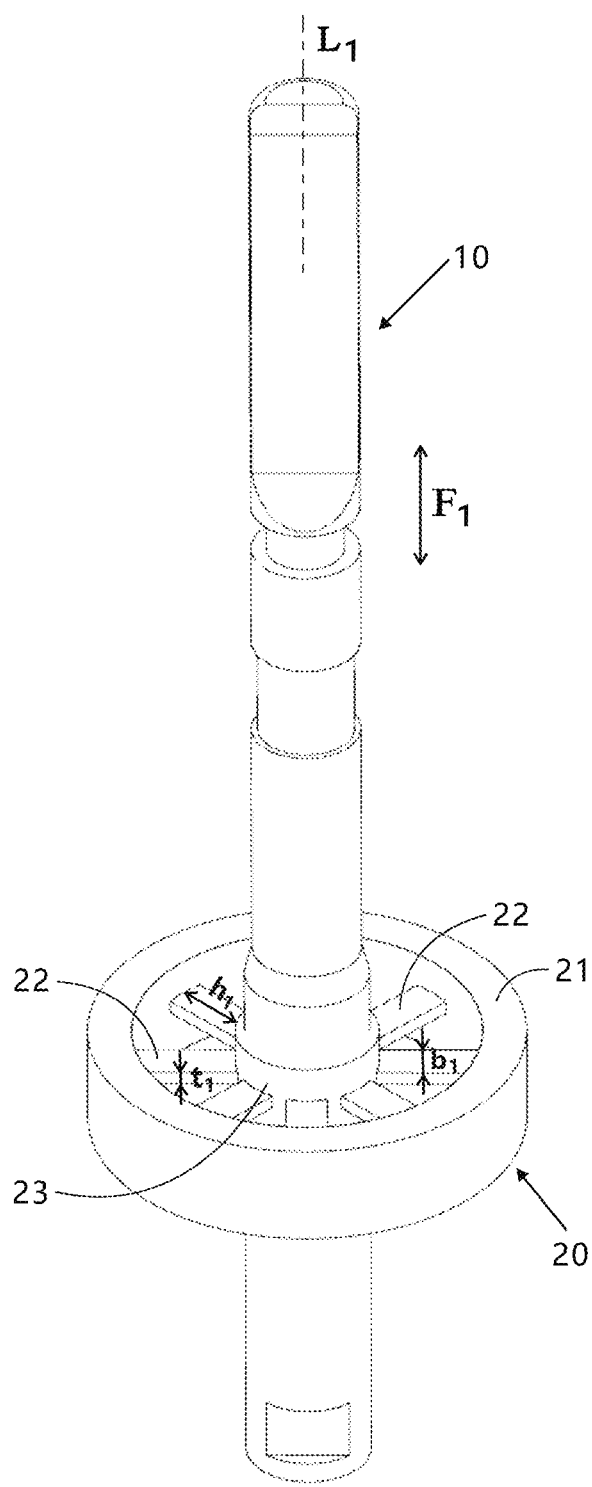
FIG. 1 is a front view of the reciprocating linear motion combination of the drive shaft that performs reciprocating linear motion and its support structure of the present invention, and the support structure shown in the figure includes a plurality of elastic members of the support structure.

EXPLANATION OF MAIN REFERENCE NUMERALS 10 a drive shaft, which performs reciprocating linear motion along the longitudinal axis of the drive shaft, hereinafter referred to as the translation shaft;

20 a linear motion support structure, which supports the drive shaft that performs reciprocating linear motion, hereinafter referred to as the linear-support structure;

21 an outer fixing ring of the reciprocating linear motion support structure, hereinafter referred to as the linear-support structure outer fixing ring;

22 an elastic member of the reciprocating linear motion support structure, hereinafter referred to as the linear-support structure elastic member;

23 an inner fixing ring of the reciprocating linear motion support structure, hereinafter referred to as the linear-support structure inner fixing ring;

30 a fixture of the reciprocating linear motion support structure, hereinafter referred to as the linear-support structure fixture;

40 a drive shaft that performs reciprocating rotary motion about the longitudinal axis of the drive shaft, hereinafter referred to as the rotating shaft;

50 a rotary motion support structure which supports the drive shaft that performs reciprocating rotary motion, hereinafter referred to as the rotary-support structure;

51 an outer fixing ring of the reciprocating rotary motion support structure, hereinafter referred to as the rotary-support structure outer fixing ring;

52 an elastic member of the reciprocating rotary motion support structure, hereinafter referred to as the rotary-support structure elastic member;

53 an inner fixing ring of the reciprocating rotary motion support structure, hereinafter referred to as the rotary-support structure inner fixing ring;

60 a fixture of the reciprocating rotary motion support structure, hereinafter referred to as the rotary-support structure fixture;

$L_1$ a longitudinal axis of the drive shaft for reciprocating linear motion;

$h_1$ a length of the linear-support structure elastic member along the radial direction of the drive shaft for reciprocating linear motion;

$b_1$ a width of the linear-support structure elastic member on the cross section perpendicular to the radial direction of the drive shaft along the direction perpendicular to the drive force $F_1$;

$t_1$ a thickness of the linear-support structure elastic member on the cross section perpendicular to the radial direction of the drive shaft along the direction parallel to the drive force $F_1$;

$L_2$ a longitudinal axis of the drive shaft for reciprocating rotary motion;

$h_2$ a length of the rotary-support structure elastic member along the radial direction of the drive shaft that performs reciprocating rotary motion;

$b_2$ a width of the rotary-support structure elastic member on the cross section perpendicular to the radial direction of the drive shaft along the direction perpendicular to the drive force $F_2$;

$t_2$ a thickness of the rotary-support structure elastic member on the cross-section perpendicular to the radial direction of the drive shaft along the direction parallel to the drive force $F_2$;

$F_1$ a force that drives the drive shaft to perform reciprocating linear motion along its longitudinal axis;

$F_2$ a force that drives the drive shaft to perform reciprocating rotary motion about its longitudinal axis.

DETAILED DESCRIPTION

In the following description of the present application, terms that express relative positions in space, such as "inner", "outer", "upper", "lower", "upper portion (or upper end)", "lower portion (or lower end)", etc. are used to briefly describe the interrelationship of one element or feature with another element(s) or feature(s) as shown in the figures. In this specification, "inner" and "outer" are relative to the radial direction of the electric cleaning care appliance. Being adjacent to its center is defined as inner, and being away from the center is defined as outer. "Upper", "lower", "upper portion", "lower portion", "upper end", and "lower end" are relative to the longitudinal axis of the electric toothbrush. When the electric cleaning care appliance is in an upright or inclined working state, the adjacent bristle ends are defined as "upper", "upper portion", or "upper end," with the opposite end defined as "lower," "lower portion", or "lower end."

When an element is described as being "on" or "coupled to" another element, it can be directly located on or coupled to the other element or there may be element(s) therebetween. When an element is described as being "directly on" or "directly coupled to" another element, there are no element(s) therebetween. Other words describing the relationship between elements should be understood to have a similar meaning (e.g., "between" is relative to "directly between," etc.).

The stationary device housing (not shown in the figure) of the present invention includes an upper device housing and a lower device housing. In the lower device housing, there are at least a part of the drive shaft 10 or 40 and a support structure 20 or 50 for supporting the drive shaft 10 or 40. Under the action of the drive force $F_1$ or $F_2$, the drive shaft 10 or 40 makes a reciprocating linear motion or a reciprocating rotary motion relative to the lower device housing of the device housing along its longitudinal axis $L_1$ or about its longitudinal axis $L_2$. In the upper device housing of the device housing, there is a head driven by the drive shaft 10, 40. The transverse axes $L_3$, $L_4$ of the head are substantially perpendicular to the longitudinal axes $L_1$, $L_2$ of the drive shaft 10, 40. FIG. 1, FIG. 2A, FIG. 2B, FIG. 2C, FIG. 2D, FIG. 2E, FIG. 3A, FIG. 3B, FIG. 3C illustrate the reciprocating linear motion of the drive shaft 10 along its longitudinal axis $L_1$. FIG. 4, FIG. 5A, FIG. 5B☐FIG. 5C, FIG. 5D, FIG. 6A, FIG. 6B☐FIG. 6C, FIG. 6D, FIG. 7A, FIG. 7B, FIG. 7C, FIG. 7D, FIG. 7E illustrate the reciprocating rotary motion of the drive shaft 40 about its longitudinal axis $L_2$.

Referring to FIG. 1, FIG. 2A, FIG. 2B, FIG. 2C, FIG. 2D, FIG. 2E, FIG. 3A, FIG. 3B, FIG. 3C, FIG. 4, FIG. 5A, FIG. 5B☐FIG. 5C, FIG. 5D, FIG. 6A, FIG. 6B☐FIG. 6C, FIG. 6D, FIG. 7A, FIG. 7B, FIG. 7C, FIG. 7D, FIG. 7E, the support structure 20, 50 of the present invention includes a inner fixing ring 23, 53 of the support structure, at least one elastic member 22, 52 of the support structure and a outer fixing ring 21, 51 of the support structure, wherein FIG. 2E and FIG. 7E show the case where there is one elastic member of the support structure. FIG. 2A to FIG. 2D and FIG. 7A to FIG. 7D show that there are multiple elastic members of the support structure. The outer fixing ring 21, 51 of the support structure, the elastic member 22, 52 of the support structure and the inner fixing ring 23, 53 of the support structure can be made of plastic, and preferably thermoplastic. The inner fixing ring 23, 53 of the support structure is fastened to the drive shaft along the circumferential direction of the drive shaft 10, 40. The inner fixing ring 23, 53 of the support structure moves together with the drive shaft 10, 40 that performs reciprocating motion, and there is no relative movement between them. The inner fixing ring 23, 53 of the support structure and the drive shaft 10, 40 can be injection-molded together to form an integral piece, or the inner fixing ring 23, 53 of the support structure and the drive shaft 10, 40 can be separate parts which can be fastened together through fittings. The outer fixing ring 21, 51 of the support structure is fastened on the inner wall of the lower device housing directly along the circumferential direction of the lower device housing or through the support structure fixture 30, 60. There is no relative movement between the outer fixing ring 21, 51 of the support structure and the support structure fixture 30, 60 (when fastened by the fixture) and the lower device housing, that is, the support structure fixture 30, 60 and the outer fixing ring 21, 51 of the support structure are both stationary relative to the lower device housing. At least one elastic member 22, 52 of the support structure is distributed between the outer fixing ring 21, 51 of the support structure and the inner fixing ring 23, 53 of the support structure, but the present invention is not limited to this. The elastic member 22, 52 of the support structure of the present invention can be integrally coupled to the inner fixing rings 23, 53 and outer fixing rings 21, 51 of the support structure 20, 50, such as in a ring shape, or a part of the elastic member of the support structure is coupled to a part of the inner and outer fixing rings. These modifications are not beyond the scope of the present invention. In addition, the cross section of the elastic member 22, 52 of the support structure of the present invention, which is perpendicular to the radial direction of the drive shaft, can be in any shape, such as polygons or a combination of linear segment(s) and arcuate segment(s), etc. and these modifications are also within the scope of the present invention.

As shown in FIG. 2B to FIG. 2E, FIG. 6B to FIG. 6D and FIG. 7E, one end of the elastic member 22, 52 of the support structure, which is fixed to the outer fixing ring 21, 51 of the support structure, is an outer end A, C. The other end of the elastic member 22, 52 of the support structure, which is opposite to the outer end A, C and fixed to the inner fixing ring 23, 53 of the support structure, is an inner end B, D. Of course, the lower device housing or the drive shaft for reciprocating motion can also be in other shapes. The inner fixing ring and outer fixing ring of the support structure can also be shaped to match the lower device housing or the drive shaft for reciprocating motion.

Figure 3C:
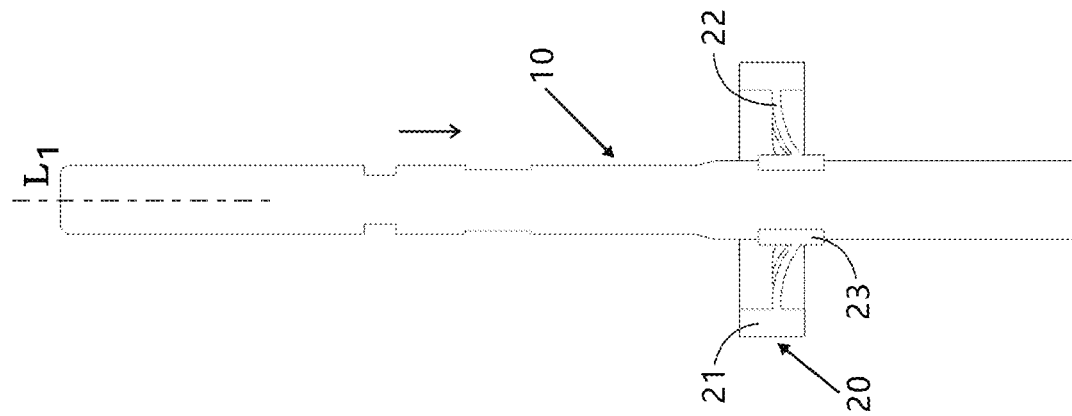
FIGS. 3A to 3C are cross-sectional views of the reciprocating linear motion combination shown in FIGS. 2B to 2D in corresponding working states, wherein FIG. 3A corresponds to the working state shown in FIG. 2B.
Figure 3B:
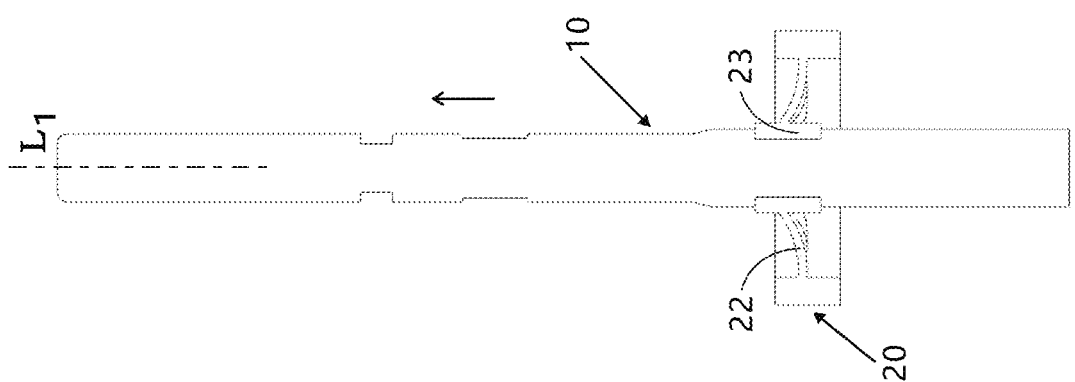
Figure 3A:
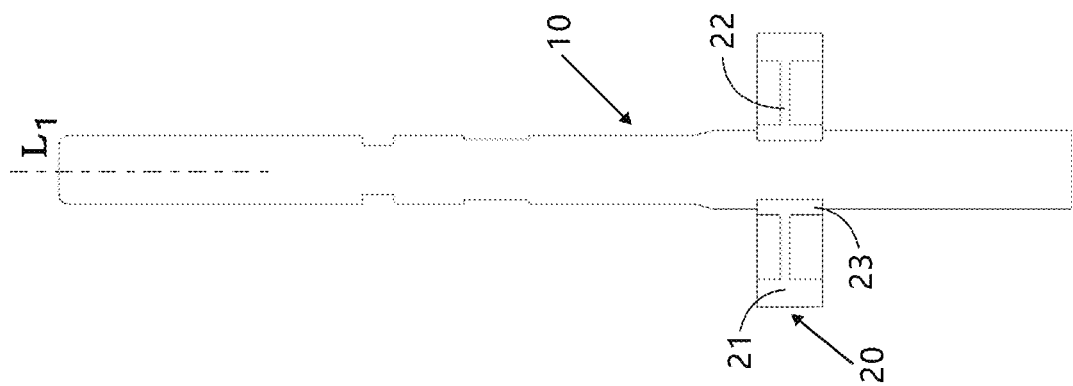
Figure 4:
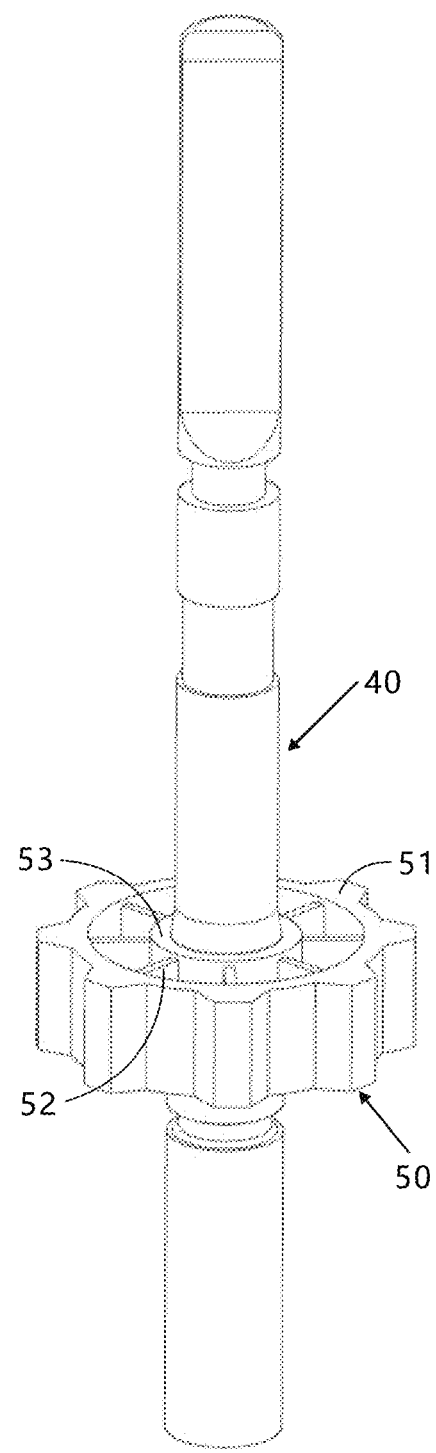
FIG. 4 is a front view of the reciprocating rotary motion combination of the drive shaft that performs the reciprocating rotary motion and its support structure of the present invention, and the support structure shown in the figure includes a plurality of elastic members of the support structure.

FIG. 1, FIG. 2A, FIG. 2B, FIG. 2C, FIG. 2D, FIG. 2E, FIG. 3A, FIG. 3B, FIG. 3C show the reciprocating linear motion of the drive shaft 10. Referring to FIG. 2B, FIG. 2E and FIG. 3A, when the translation shaft 10 is at the origin position of its reciprocating linear motion trajectory (the middle position of the reciprocating linear motion trajectory), the linear-support structure 20 is also at the origin position. At this time, the linear-support structure elastic member 22 is in a free state, and the linear-support structure elastic member 22 does not produce elastic bending deformation. Referring to FIG. 2C and FIG. 3B, when the translation shaft 10 moves upward along its longitudinal axis $L_1$ from the origin position, due to the fastening of the linear-support structure inner fixing ring 23 and the translation shaft 10, the translation shaft 10 drives the linear-support structure inner fixing ring 23 to move upward, and the linear-support structure inner fixing ring 23 then drives the inner end B of the linear-support structure elastic member 22 to move upward. The outer end A of the linear-support structure elastic member is fixedly coupled to the linear-support structure outer fixing ring 21, and the linear-support structure outer fixing ring 21 is stationary relative to the lower device housing. Therefore, the translation shaft 10 moves relative to the outer end A of the linear-support structure elastic member. The linear-support structure elastic member 22 presents elastic bending deformation under the action of the relative movement of the translation shaft 10. More specifically, when the translation shaft 10 drives the inner end B of the linear-support structure elastic member 22 to move upward from the origin position, the inner end B of the linear-support structure elastic member 22 produces upward bending motion relative to the outer end A of the linear-support structure elastic member 22. The linear-support structure elastic member 22 produces upward bending deformation. The displacement generated by the position of the inner end B of the current linear-support structure elastic member 22 relative to the position of the inner end B of the elastic member 22 in the free state is the upward deflection of the linear-support structure elastic member 22. FIG. 2D and FIG. 3C illustrate the downward movement of the translation shaft 10 along its longitudinal axis $L_1$ away from the origin position. Since the linear-support structure inner fixing ring 23 and the translation shaft 10 are fastened, when the translation shaft 10 moves downward from the original position, the translation shaft 10 drives the linear-support structure inner fixing ring 23 to move downward, and then drives the inner end B of the linear-support structure elastic member to move downward. Since the outer end A of the linear-support structure elastic member 22 is tightly coupled to the linear-support structure outer fixing ring 21, the linear-support structure outer fixing ring 21 is stationary relative to the lower device housing. Therefore, the outer end A of the linear-support structure elastic member 22 is stationary relative to the lower device housing. The translation shaft 10 is relatively moved relative to the outer end A of the linear-support structure elastic member 22. The linear-support structure elastic member 22 is elastically bent and deformed under the action of the relative movement of the translation shaft 10. More specifically, when the translation shaft 10 drives the inner end B of the linear-support structure elastic member 22 to move downward from the free state of the elastic member, the inner end B of the linear-support structure elastic member 22 produces downward bending motion relative to its outer end A. The linear-support structure elastic member 22 produces downward bending deformation, and the direction of this bending deformation is opposite to the direction of bending deformation produced when the translation shaft 10 moves upward from the origin position. The displacement generated by the position of the inner end B of the current linear-support structure elastic member 22 relative to the position of the inner end B of the elastic member 22 in a free state is the downward deflection of the linear-support structure elastic member 22. Accordingly, when the drive shaft 10 performs a reciprocating linear motion, it drives the inner end B of the linear-support structure elastic member 22 to perform an upward-downward reciprocating bending motion around the outer end A of the elastic member. The linear-support structure elastic member 22 generates upward-downward bending deformation.

As stated above, the translation shaft 10 performs linear reciprocating motion relative to the linear-support structure outer fixing ring 21. The outer and inner ends, i.e., both ends A and B, of the linear-support structure elastic member 22 are respectively fixed to the linear-support structure outer fixing ring 21 and the linear-support structure inner fixing ring 23. The linear-support structure elastic member 22 has the performance of a spring, which is equivalent to a bending elastic member. The linear-support structure inner fixing ring 23 and the translation shaft 10 are tightly coupled without gap, that is, the translation shaft 10 and the B end of the linear-support structure elastic member 22 are tightly coupled without gap. The linear-support structure inner fixing ring 23, the B end of the linear-support structure elastic member 22 and the translation shaft 10 have the same linear speed, so this fixed connection without gap can ensure that the movement noise between the translation shaft 10 and the linear-support structure 20 is very small.

The dimension of the linear-support structure elastic member 22 along the direction perpendicular to the drive force $F_1$ on the cross section perpendicular to the radial direction of the drive shaft is set as the width $b_1$; the dimension of the linear-support structure elastic member 22 along the direction parallel to the drive force $F_1$ on the cross section perpendicular to the radial direction of the drive shaft is set as the thickness $t_1$. In an embodiment of the present invention, $b_1$ is selected to be greater than three times of $t_1$, that is, $b_1>3t_1$. It is set that when the linear-support structure elastic member 22 is subjected to a force along the circumferential tangential direction of the translation shaft 10, the bending deformation section coefficient of the linear-support structure elastic member 22 corresponding to the generated bending deformation is the circumferential bending deformation section coefficient $I_{z1}$; when the linear-support structure elastic member 22 is subjected to a force parallel to the longitudinal axis $L_1$ of the translation shaft 10 (i.e., the drive force $F_1$), the bending deformation section coefficient of the linear-support structure elastic member 22 corresponding to the generated bending deformation is the axial bending deformation section coefficient $I_{z2}$. The axial bending deformation section coefficient $I_{z2}$ can also be understood as the bending deformation section coefficient of the cross section composed of the thickness $t_1$ in the direction of the longitudinal axis $L_1$ of the translation shaft 10 on the cross section perpendicular to the radial direction of the drive shaft and the width $b_1$ in the circumferential direction (perpendicular to the direction of the drive force $F_1$) of the translation shaft 10 on the cross section, when the thickness $t_1$ of the linear-support structure elastic member 22 along the direction of the longitudinal axis $L_1$ (the direction of drive force $F_1$) of translation shaft 10 on the cross section perpendicular to the radial direction of the drive shaft is the force direction and the linear-support structure elastic member 22 produces bending deformation. Since the numerical ratio of $b_1$ to $t_1$ is reasonably selected in this embodiment, the axial bending deformation section coefficient $I_{z2}$ of the linear-support structure elastic member 22 may be much less than the circumferential bending deformation section coefficient $I_{z1}$, and the axial bending deformation section coefficient $I_{z2}$ may even be less than one-ninth of the circumferential bending deformation section coefficient $I_{z1}$ ($I_{z2}<I_{z1}/9$). Therefore, the linear-support structure elastic member 22 not only easily produces bending deformation in response to the reciprocating motion of the translation shaft 10 along the longitudinal axis $L_1$ of the drive shaft, and can also prevent the translation shaft 10 from rotating about its longitudinal axis $L_1$, so that the linear-support structure elastic member 22, driven by the reciprocating linear motion of the drive shaft 10, can reliably produce corresponding elastic bending deformation in response to the drive force $F_1$ of the translation shaft 10. In the present invention, the bending deformation section is the cross section formed by $t_1$ and $b_1$ of the linear-support structure elastic member 22. Obviously, the linear-support structure elastic member 22 is more difficult to bend when subjected to a force in the circumferential direction (the direction perpendicular to the drive force $F_1$) of the translation shaft 10.

In the present invention, the linear-support structure inner fixing ring 23 is fixedly coupled to the translation shaft 10. The maximum amplitude of the translation shaft 10 is approximately equal to the maximum deflection of the linear-support structure elastic member 22. The maximum amplitude of the translation shaft 10 refers to the maximum displacement of the translation shaft 10 from the origin of the trajectory corresponding to the free state of the linear-support structure elastic member 22 to the upper (or lower) side.

In addition, since the linear-support structure inner fixing ring 23 is fixedly coupled to the translation shaft 10, the thickness of the linear-support structure inner fixing ring 23 along the direction of the longitudinal axis $L_1$ of the translation shaft 10 is greater than the thickness $t_1$ of the linear-support structure elastic member 22 in the direction of the longitudinal axis $L_1$ (i.e., the direction of drive force $F_1$) of the translation shaft 10 on the cross section perpendicular to the radial direction of the drive shaft, which can thereby ensure that the linear-support structure inner fixing ring 23 and the translation shaft 10 are firmly coupled.

In the present invention, as shown in FIG. 3A, the distance between the upper surfaces of the inner and outer fixing rings 21 and 23 of the linear-support structure 20 and the head is designed to be less than the distance between the upper edge of the linear-support structure elastic member 22 and the head, or the distance between the lower surfaces of the inner and outer fixing rings 21, 23 of the linear-support structure 20 and the head is designed to be greater than the distance between the lower edge of the linear-support structure elastic member 22 and the head, such that at least one side of the upper side or the lower side of the cross section of the combined linear-support structure 20 in the direction parallel to the longitudinal axis $L_1$ of the translation shaft 10 is in a concave shape, that is, at least one of the upper side or the lower side of the cross section of the combined linear-support structure 20 in the direction parallel to the movement of the translation shaft 10 is in a concave shape.

As stated above, the linear-support structure elastic member 22 has spring characteristics. According to the principle of the spring oscillator, the driving kinetic energy of the translation shaft 10 can be converted into the elastic potential energy of the linear-support structure elastic member 22. Similarly, the elastic potential energy of the linear-support structure elastic member 22 can be converted into the driving kinetic energy of the translation shaft 10. The elastic potential energy of the linear-support structure elastic member 22 and the driving kinetic energy of the translation shaft 10 are repeatedly converted, and the energy loss during the conversion is very small. When the natural frequency of the elastic system composed of the linear-support structure elastic member 22 and the motion frequency of the translation shaft 10 are in the resonance oscillation range, that is, the ratio of the natural frequency of the elastic system to the motion frequency of the translation shaft 10 is 75%-125%, the conversion of the elastic potential energy and the driving kinetic energy between the linear-support structure elastic member 22 and the translation shaft 10 hardly produces energy loss. For this reason, the linear-support structure elastic member 22 can be designed such that its cross section perpendicular to the radial direction of the translation shaft 10 is a rectangle. At this time, the equivalent spring stiffness coefficient of the linear-support structure elastic member 22 is $K_{1r}=n*E*b_{1r}*t_{1r}^3/(4*h_{1r}^3)$, where n is the equivalent number of the linear-support structure elastic member 22; E is the elastic modulus of the material; $b_{1r}$, $t_{1r}$, $h_{1r}$ represent $b_1$, $t_1$, $h_1$ of the linear-support structure elastic member 22 respectively when the cross section of the linear-support structure elastic members 22 is rectangle. It can be known from the principle of elastic oscillator that the natural frequency of the elastic system composed of the linear-support structure elastic member 22 is $2\sqrt{K_{1r}/m_{1r}}$, and $m_{1r}$ is the mass of the elastic system. By reasonably selecting the values of $b_{1r}$, $t_{1r}$, $h_{1r}$ or the value ratio between them, the ideal equivalent spring stiffness coefficient $K_{1r}$ can be obtained, and the required natural frequency of the elastic system composed of the linear-support structure elastic members 22 can be thereby obtained, so that when the natural frequency of the elastic system composed of the linear-support structure elastic member 22 and the linear motion frequency of the translation shaft 10 are in the resonance oscillation range, there is almost no energy loss between the linear-support structure elastic member 22 and the translation shaft 10. The linear-support structure elastic member 22 can also be designed such that its cross section perpendicular to the radial direction of the translation shaft 10 is triangular. At this time, the equivalent spring stiffness coefficient of the linear-support structure elastic member 22 is $K_{1s}=n*E*b_{1s}*t_{1s}^3/(12*h_{1s}^3)$, where n is the equivalent number of the linear-support elastic member 22; E is the elastic modulus of the material; $b_{1s}$, $t_{1s}$, $h_{1s}$ represent $b_1$, $t_1$, $h_1$ of the linear-support structure elastic member 22 respectively when the cross section of the linear-support structure elastic member 22 is triangular. It can be known from the principle of elastic oscillator that the natural frequency of the elastic system composed of the linear-support structure elastic member 22 is $2\sqrt{K_{1s}/m_{1s}}$, and $m_{1s}$ is the mass of the elastic system. Similarly, by reasonably selecting the values of $b_{1s}$, $t_{1s}$, $h_{1s}$ or the value ratio between them, the ideal equivalent spring stiffness coefficient $K_{1r}$ can be obtained, and the required natural frequency of the elastic system composed of the linear-support structure elastic members 22 can be thereby obtained, so that when the natural frequency of the elastic system composed of the linear-support structure elastic member 22 and the linear motion frequency of the translation shaft are in the resonance oscillation range, there is almost no energy loss between the linear-support structure elastic member 22 and the translation shaft 10. In addition, the natural frequency of the elastic system composed of the linear-support structure elastic members 22 can also be obtained through experiments.

Figure 5D:
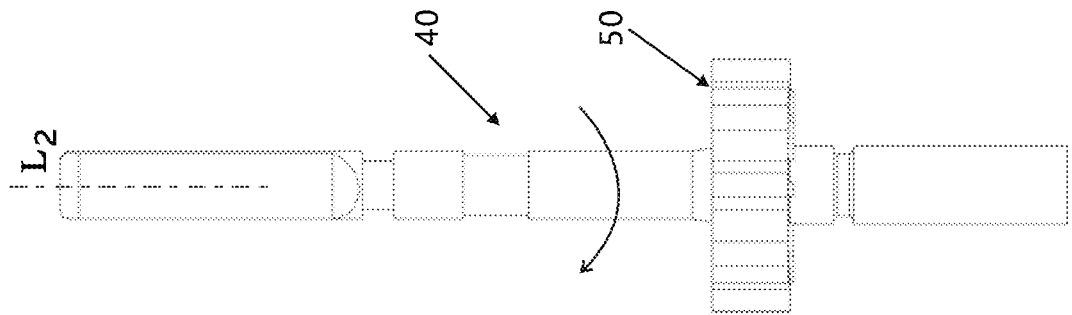
Figure 5C:
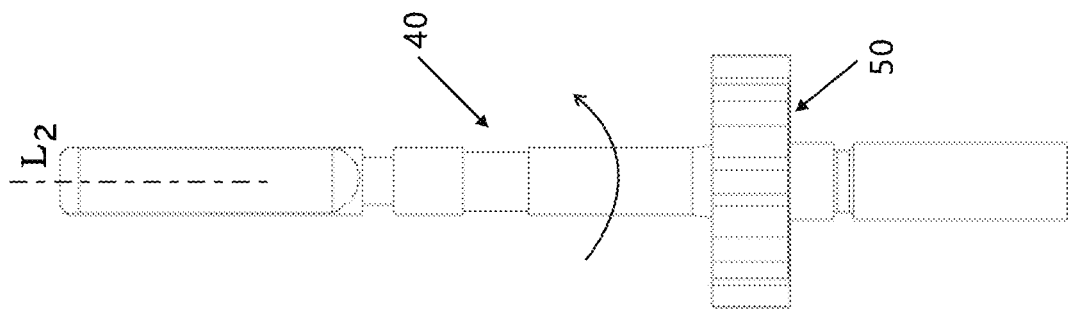
Figure 5B:
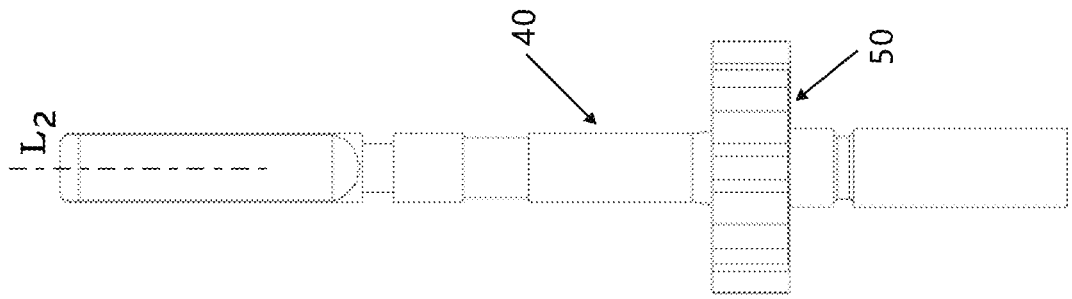
Figure 5A:
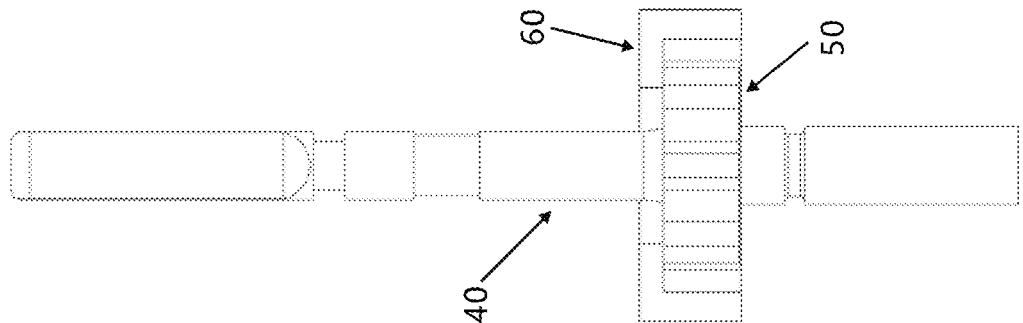

FIG. 4, FIG. 5A, FIG. 5B☐FIG. 5C, FIG. 5D☐FIG. 6A, FIG. 6B☐FIG. 6C, FIG. 6D, FIG. 7A, FIG. 7B☐FIG. 7C, FIG. 7D, FIG. 7E illustrate the reciprocating rotary motion of the drive shaft 40 about its longitudinal axis $L_2$ relative to the lower device housing. In this embodiment, in the lower device housing is installed at least a part of the rotating shaft 40 and the rotary motion support structure 50 for supporting the rotating shaft 40. The remaining part of the rotating shaft 40 can extend into the upper device housing, and a head driven by the rotating shaft 40 is also provided in the upper device housing. The transverse axis of the head is substantially perpendicular to the longitudinal axis $L_2$ of the rotating shaft 40. The rotary-support structure 50 includes a rotary-support structure outer fixing ring 51, at least one rotary-support structure elastic member 52 and a rotary-support structure inner fixing ring 53. The rotary-support structure inner fixing ring 53 is fastened to the rotating shaft 40, and there is no relative movement between them. The rotary-support structure inner fixing ring 53 rotates with the rotation of the rotating shaft 40. The rotary-support structure outer fixing ring 51 is fastened to the inner side of the lower device housing directly or by the rotary-support structure fixing structure 60. The rotary-support structure outer fixing ring 51 is stationary relative to the rotary-support structure fixture 60 (when fastened by the fixture) and the lower device housing. At least one rotary-support structure elastic member 52 is distributed between the rotary-support structure outer fixing ring 51 and the rotary-support structure inner fixing ring 53. As shown in FIG. 6B to FIG. 6D and FIG. 7E, the outer end C of the rotary-support structure elastic member 52 is firmly coupled to the rotary-support structure outer fixing ring 51, and the inner end D of the rotary-support structure elastic member 52 is firmly coupled to the rotary-support structure inner fixing ring 53. FIG. 6B, FIG. 7B and FIG. 7E show the situation where the rotary-support structure 50 is at the origin position of the reciprocating rotary motion trajectory of the rotating shaft 40. At this time, the deflection angle of the rotation axis 40 is zero when the rotation axis 40 rotates around its longitudinal axis $L_2$, the rotary-support structure elastic member 52 is in a free state, and the elastic member 52 does not produce elastic bending deformation. Referring to FIG. 6C and FIG. 7C, when the rotating shaft 40 moves in a clockwise direction away from the origin position of its reciprocating rotary motion trajectory, due to the fastening of the rotary-support structure inner fixing ring 53 and the rotating shaft 40, the inner end D of the rotary-support structure elastic member 52 is firmly coupled to the rotary-support structure inner fixing ring 53. The rotating shaft 40 drives the rotary-support structure inner fixing ring 53 to rotate in a clockwise direction. The rotary-support structure inner fixing ring 53 also drives the inner end D of the rotary-support structure elastic member 52 to rotate in the clockwise direction, while the outer end C of the rotary-support structure elastic member 52 is tightly coupled to the rotary-support structure outer fixing ring 51. The rotary-support structure outer fixing ring 51 and the outer end C of the rotary-support structure elastic member 52 are stationary relative to the lower device housing. The rotating shaft 40 moves relative to the rotary-support structure outer fixing ring 51 and the outer end C of the rotary-support structure elastic member 52. The inner end D of the rotary-support structure elastic member 52 is stationary relative to the rotating shaft 40. The rotary-support structure elastic member 52 is elastically bent and deformed under the action of the rotating shaft 40. More specifically, when the rotating shaft 40 drives the inner end D of the rotary-support structure elastic member 52 to move clockwise away from the free state of the elastic member 52, the rotary-support structure elastic member 52 is bent and deformed counterclockwise around the outer end C thereof. The displacement generated by the position of the inner end D of the current rotary-support structure elastic member 52 relative to the position of the inner end D when the elastic member is in a free state is the counterclockwise deflection of the elastic member 52. Referring to FIG. 6D and FIG. 7D, they illustrate the case where the rotating shaft 40 moves in the counterclockwise direction away from the origin position of the reciprocating rotational motion trajectory. Since the rotary-support structure inner fixing ring 53 is fastened to the rotary drive shaft 40, the rotary drive shaft 40 drives the rotary-support structure inner fixing ring 53 to move in the counterclockwise direction, and the inner end D of the rotary-support structure elastic member 52 is firmly coupled to the rotary-support structure inner fixing ring 53. The inner end D of the rotary-support structure elastic member 52 is also driven to move in the counterclockwise direction, the outer end C of the rotary-support structure elastic member 52 is firmly coupled to the rotary-support structure outer fixing ring 51, and the rotary-support structure outer fixing ring 51 is stationary relative to the lower device housing. The rotating shaft 40 rotates relative to the rotary-support structure outer fixing ring 51. The inner end D of the rotary-support structure elastic member 52 rotates relative to the outer end C of the rotary-support structure elastic member 52. The rotary-support structure elastic member 52 exhibits elastic bending deformation under the action of the rotating shaft 40. More specifically, when the rotating shaft 40 drives the inner end D of the rotary-support structure elastic member 52 to move in the counterclockwise direction away from the free state of the elastic member 52, the inner end D of the rotary-support structure elastic member 52 rotates clockwise around the outer end C thereof. The displacement generated by the current position of the inner end D of the rotary-support structure elastic member 52 relative to the position of the inner end D in the free state of the elastic member 52 is the clockwise deflection of the elastic member 52.

Referring to FIG. 4, FIG. 5A, FIG. 5B□FIG. 5C, FIG. 5D□FIG. 6A, FIG. 6B□FIG. 6C, FIG. 6D, FIG. 7A, FIG. 7B□FIG. 7C, FIG. 7D, FIG. 7E, the rotating shaft 40 drives the rotary-support structure elastic member 52 to perform a reciprocating, clockwise-counterclockwise bending motion around the outer end C of the elastic member 52. The rotary-support structure elastic member 52 is equivalent to elastic pieces. The rotary-support structure inner fixing ring 53 and the rotating shaft 40 are fastened and have the same angular velocity. The rotating shaft 40 and the rotary-support structure inner fixing ring 53 are tightly coupled without gap. The rotating shaft 40 is equivalent to be coupled to the rotary-support structure elastic member 52 without gap. The dimension of the rotary-support structure elastic member 52 along the radial direction of the rotating shaft 40 is set as the length $h_2$. The dimension of the rotary-support structure elastic member 52 on the cross section perpendicular to the radial direction of the drive shaft along the direction perpendicular to the drive force $F_2$ is set as the width $b_2$. The dimension of the rotary-support structure elastic member 52 on the cross section perpendicular to the radial direction of the drive shaft along the direction parallel to the drive force $F_2$ is set as the thickness $t_2$, preferably $b_2 > 3t_2$. It is set that when the rotary-support structure elastic member 52 is bent and deformed by the force from the circumferential tangential direction of the rotating shaft 40, the bending deformation section coefficient corresponding to the rotary-support structure elastic member 52 is the circumferential bending deformation section coefficient $I_{z3}$, which can also be understood as the circumferential bending deformation section coefficient $I_{z3}$ of the cross section composed of $b_2$ and $t_2$ when the rotary-support structure elastic member 52 is subjected to the force in the circumferential tangential direction of the rotating shaft 40. It is set that when the rotary-support structure elastic member 52 is subjected to a force parallel to the longitudinal axis $L_2$ of the rotating shaft 40, the bending deformation section coefficient of the rotary-support structure elastic member 52 corresponding to the generated bending deformation is the axial bending deformation section coefficient $I_{z4}$, which can also be understood as the axial bending deformation section coefficient $I_{z4}$ of the cross section composed of $b_2$ and $t_2$ when the rotary-support structure elastic member 52 is subjected to a force parallel to the longitudinal axis $L_2$ of the rotating shaft 40. Since the numerical ratio of $b_2$ and $t_2$ is reasonably selected in the present invention such that $b_2 > 3t_2$, the axial bending deformation section coefficient $I_{z4}$ of the rotary-support structure elastic member 52 is much larger than the circumferential bending deformation section coefficient $I_{z3}$, the circumferential bending deformation section coefficient $I_{z3}$ may even be less than one-ninth of the axial bending deformation section coefficient $I_{z4}$ ($I_{z3} < I_{z4}/9$). Therefore, the rotary-support structure elastic member 52, driven by the reciprocating rotational motion of the drive shaft 40, can reliably produce elastic bending deformation in response to the drive force of the rotating shaft 40. In the present invention, the bending deformation section is the cross-section composed of $b_2$ and $t_2$ of the rotary-support structure elastic member 52. Obviously, under the action of the force along the circumferential direction of the rotating shaft 40, the rotary-support structure elastic member 52 is easier to bend, so that the rotary-support structure elastic member 52, driven by the reciprocating rotational motion of the driving shaft 40, can reliably generate the elastic bending deformation in response to the drive force of the rotating shaft 40.

In this embodiment, the rotary-support structure inner fixing ring 53 is fixedly coupled to the drive shaft 40 for rotary motion. The maximum clockwise (or counterclockwise) rotation angle reached by the drive shaft 50 for rotary motion when the drive shaft 50 leaves the trajectory point corresponding to the free state of the elastic member 52 is roughly equal to the maximum counterclockwise (or clockwise) rotation angle of the rotary-support structure elastic member 52.

Further exemplary embodiments of the present invention will be described below in conjunction with FIGS. 8-10 by taking electric toothbrushes and dental irrigators as examples. Although the following only takes the electric toothbrush and the dental irrigator as examples for explanation, the present invention is not limited thereto. The present invention is also applicable to other electric cleaning care appliances with other drive shafts for reciprocating motion, such as facial cleansers, shavers, and the like.

Figure 8:
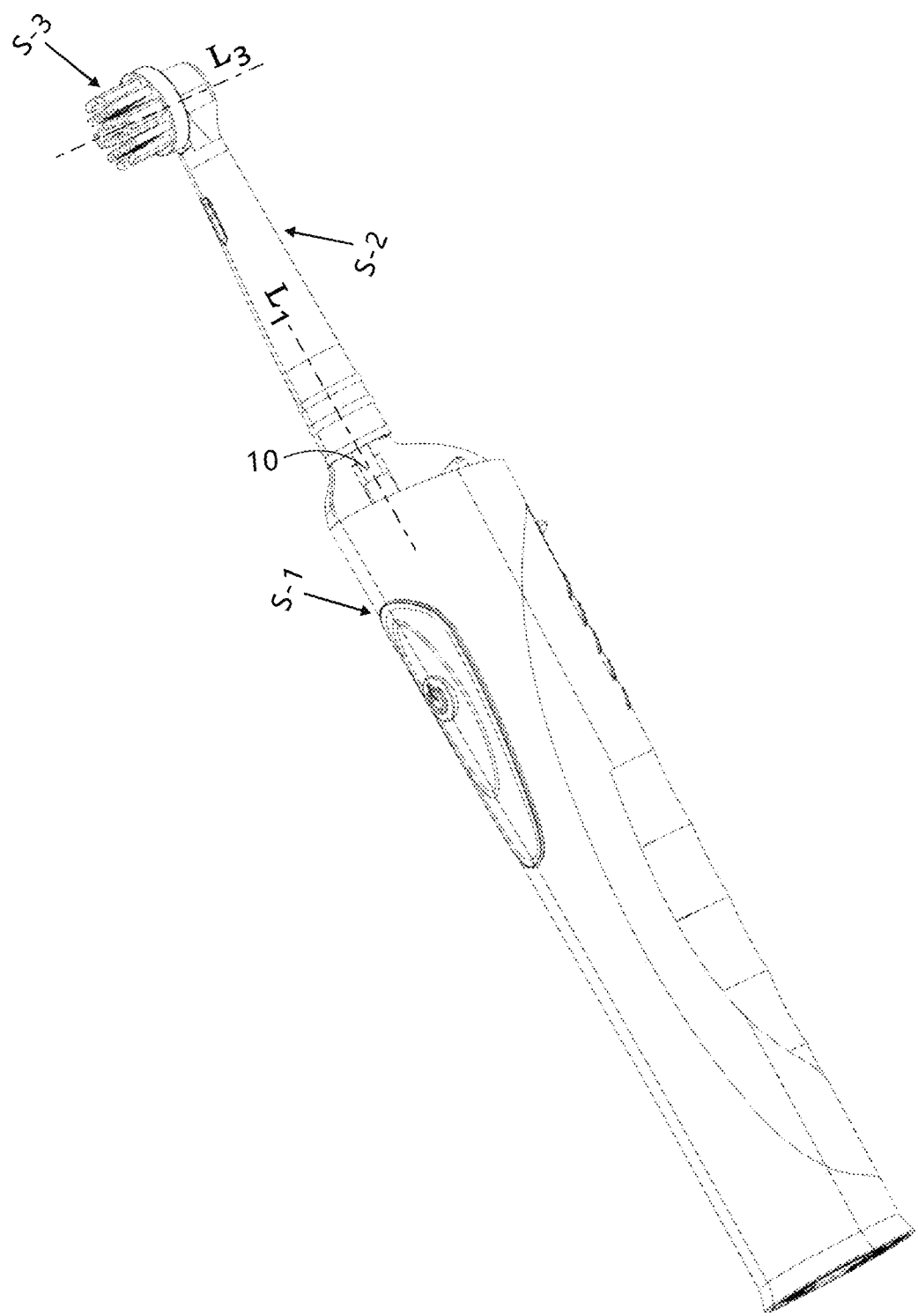
FIG. 8 is a schematic diagram of an electric toothbrush equipped with the linear motion combination shown in FIG. 1.

FIG. 8 is a schematic diagram of an electric toothbrush equipped with the reciprocating linear motion combination shown in FIG. 1. FIG. 9 is a schematic diagram of an electric toothbrush equipped with the reciprocating rotary motion combination shown in FIG. 4. FIG. 10 is a schematic diagram of a dental irrigator equipped with the reciprocating linear motion combination shown in FIG. 1.

As shown in FIG. 8, the drive shaft (translation shaft) 10 for reciprocating linear motion of the electric toothbrush is arranged in the lower handle housing S-1 and extends into the upper handle housing S-2, and a brush head driven by the translation shaft 10 is also installed in the upper handle housing S-2. Bristles S-3 for cleaning teeth are distributed on the brush head. The axis $L_3$ of the bristles S-3 is approximately perpendicular to the longitudinal axis $L_1$ of the transition shaft 10. In the embodiment shown in FIG. 10, the translation shaft 10 is arranged in the lower housing C-1 of the dental irrigator. A flushing head is installed in the flushing head housing C-2, and the flushing liquid driven by the translation shaft 10 flows out via the flushing head. For this type of electric cleaning care appliance, the maximum amplitude of the translation shaft 10 is small, which is about 2 mm. Therefore, the linear-support structure 20 of the present invention is especially suitable for electric cleaning care appliance with the maximum amplitude less than 3 mm of the translation shaft 10. More specifically, the linear-support structure 20 of the present invention is suitable for use in electric cleaning care products where the total displacement of the translation shaft 10 from top to bottom is less than 6 mm. For duality, it is generally expected that the drive shaft of the electric cleaning care products can withstand more than 100,000 reciprocating motions. To this end, the length $h_1$ of the linear-support structure elastic member 22 along the radial direction of the transition shaft 10 is designed to be more than three times the thickness $t_1$ of the linear-support structure elastic member 22 along the longitudinal axis $L_1$ (i.e., the direction of drive force $F_1$) of the transition shaft 10 on the cross section perpendicular to the radial direction of the drive shaft, that is, $h_1 > 3t_1$, so as to ensure that the linear-support structure elastic member 22 can reliably realize the reciprocating bending deformation during the life cycle of the electric cleaning care appliances. The applicant has further obtained through a large number of experiments that the dimension $t_1$ of the linear-support structure elastic member 22 along the direction of the longitudinal axis $L_1$ (i.e., the direction of drive force $F_1$) of the transition shaft 10 on the cross section perpendicular to the radial direction of the drive shaft is preferably in the range of 0.1 mm-1.3 mm. More preferably, the thickness $t_1$ of the linear-support structure elastic member 22 along the direction of the longitudinal axis $L_1$ (i.e., the direction of drive force $F_1$) of the transition shaft 10 on the cross section perpendicular to the radial direction of the drive shaft is in the range of 0.2 mm-0.7 mm.

In the embodiment shown in FIG. 8, the pressure exerted by teeth on the bristles S-3 is approximately perpendicular to the longitudinal axis $L_1$ of the translation shaft 10. The pressure exerted by teeth on the bristles S-3 is equivalently exerted on the linear-support structure elastic member 22, and is also equivalent to applying a force (pressure or tension) along the direction from the inner end B to the outer end A of the linear-support structure elastic member 22. According to Newton's third law, the linear-support structure elastic member 22 will generate a resistance force against the pressure (or tension) exerted by the teeth on the bristles S-3. The direction of the resultant force of the resistance force is substantially perpendicular to the longitudinal axis $L_1$ of the translation shaft and is opposite to the direction of the pressure applied by the teeth on bristle S-3. Therefore, the linear-support structure elastic member 22 constrains the movement of the translation shaft 10 in the radial direction. The linear-support structure elastic member 22 constrains the movement of the translation shaft 10 along the direction perpendicular to its longitudinal axis $L_1$, and forms a support for the translation shaft 10 in the radial direction of the translation shaft 10. Since the linear-support structure elastic member 22 forms the support for the drive shaft 10 along the radial direction of the translation shaft 10, the direction of the supporting force generated by the linear-support structure elastic member 22 and the movement displacement direction of the translation shaft 10 are 90 degrees; and the linear-support structure inner fixing ring 23 is fixedly coupled to the translation shaft 10, between the linear-support structure inner fixing ring 23 and the translation shaft 10 there is no need to overcome the frictional force to perform work. Therefore, no energy loss occurs in the support of the linear-support structure 20 for the drive shaft 10 along the radial direction of the translation shaft 10.

In the present invention, the linear-support structure 20 can not only constrain the radial movement of the translation shaft 10, but also form an effective support for the translation shaft 10, and the translation shaft 10 and the inner fixing ring 23 of the linear-support structure 20 are connected without gap, thereby avoiding the impact and collision of the translation shaft 10 on the linear-support structure 20, and greatly reducing the noise. In addition, the energy loss of the reciprocating conversion between the elastic potential energy of the linear-support structure elastic member 22 and the driving kinetic energy of the translation shaft 10 is very small.

Figure 9:
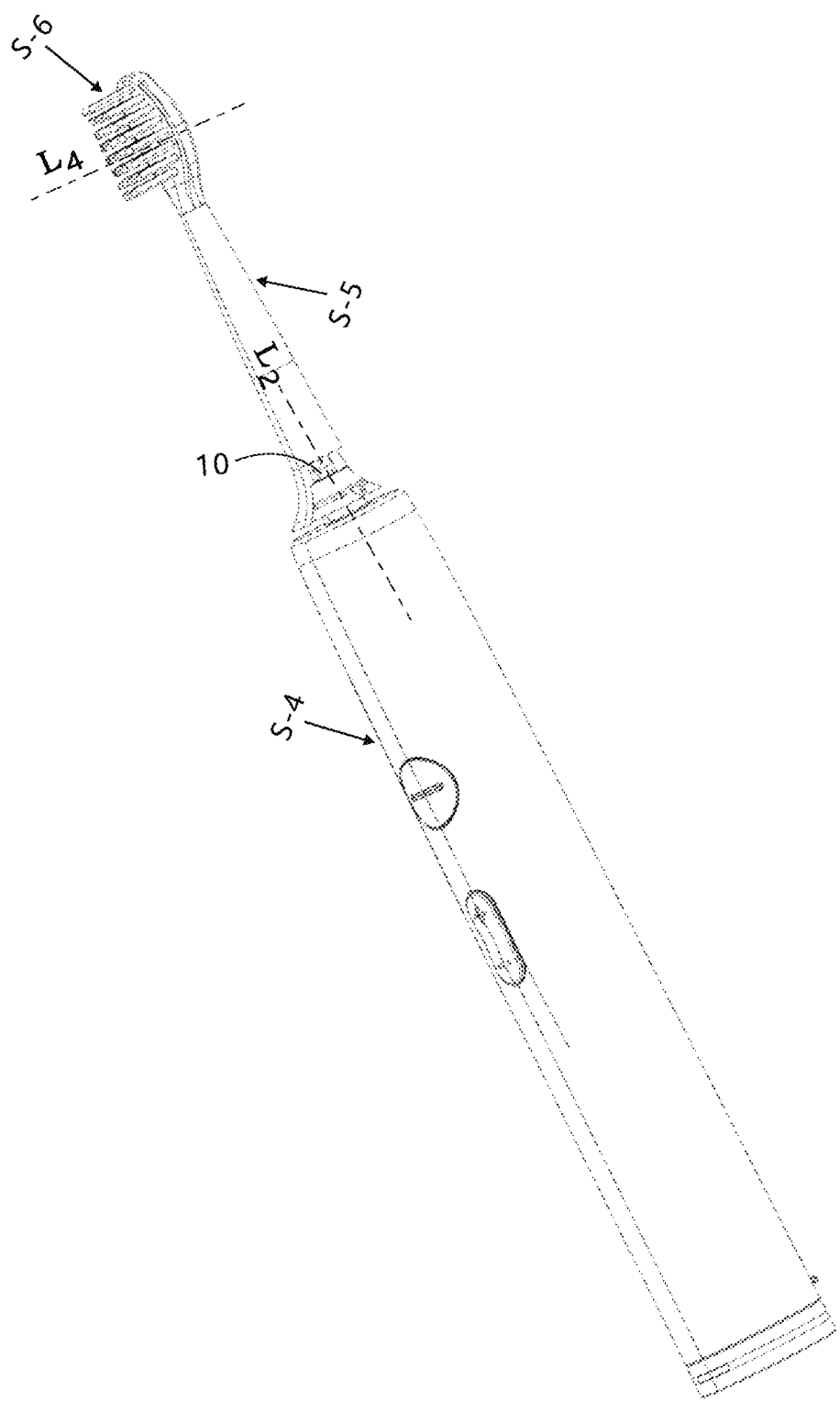
FIG. 9 is a schematic diagram of an electric toothbrush equipped with the rotary motion combination shown in FIG. 4.
Figure 10:
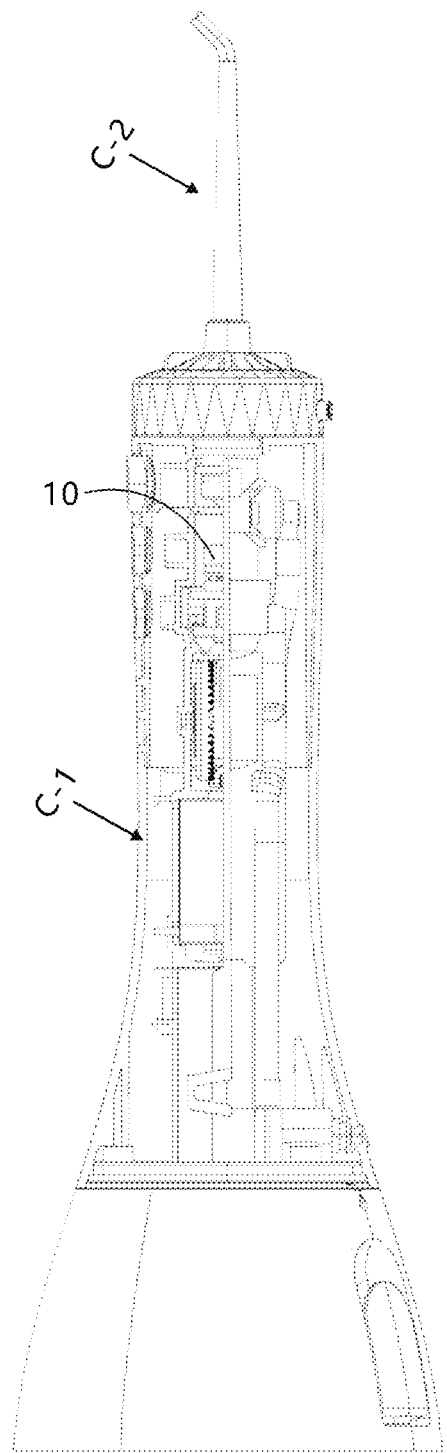
FIG. 10 is a schematic diagram of a dental irrigator equipped with the linear motion combination shown in FIG. 1.

Referring to FIG. 9, the drive shaft 40 of the electric toothbrush for reciprocating rotary motion is arranged in the lower handle housing S-4 and extends into the upper handle housing S-5. Within the upper handle housing S-5 is also equipped a brush head driven by the drive shaft 40. Bristles S-6 for cleaning teeth is distributed on the brush head. The axis $L_4$ of the bristles S-6 is substantially perpendicular to the longitudinal axis $L_4$ of the rotating shaft 40. For electric cleaning care appliances such as electric toothbrushes, the rotation angle amplitude of the rotating shaft 40 is relatively small, which is about 25 degrees. Therefore, the rotating-support structure 50 of the present invention is suitable for electric cleaning care appliances with a maximum rotation angle amplitude of the rotating shaft 40 less than 40 degrees. More specifically, the rotating-support structure 50 of the present invention is suitable for electric cleaning care appliances whose total rotation angle of the rotating shaft 40 is less than 80 degrees. The total rotation angle of the rotating shaft 40 is twice the maximum rotation angle amplitude, and it can also be understood that the total rotation angle of the rotating shaft 40 is the angle swept from the leftmost to the rightmost away from the rotation center. For durability, it is generally desirable that the drive shaft of the electric cleaning care appliance can withstand more than 100,000 reciprocating movements. To this end, in yet another embodiment of the present invention, the rotating-support structure elastic member 52 is arranged so that its length $h_2$ along the radial direction of the rotating shaft 40 is greater than three times the thickness $t_2$ of the elastic member 52 along the direction of the drive force $F_2$ parallel to the rotating shaft 40 on the cross section perpendicular to the radial direction of the drive shaft, that is, $h_2 > 3t_2$, to ensure that the rotating-support structure elastic member 52 can reliably realize reciprocating bending deformation during the life cycle of the electric cleaning care products. The applicant has further obtained from a large number of experiments that it is preferable that the thickness $t_2$ of the rotating-support structure elastic member 52 along the circumferential direction of the rotating shaft 40 on the cross section perpendicular to the radial direction of the drive shaft is in the range of 0.1 mm-1.3 mm, and more preferably, $t_2$ is in the range of 0.2 mm-0.7 mm.

In contrast to the existing shaft-hole matching structure, the drive shaft that performs reciprocating motion (the drive shaft that performs reciprocating rotary motion or the drive shaft that performs reciprocating linear motion) passes through the shaft sleeve, and there is generally a motion clearance of 0.01 mm-0.03 mm between the shaft sleeve and the drive shaft that performs reciprocating motion. The shaft sleeve restricts the radial movement of the drive shaft and supports the drive shaft. Due to the existence of the above-mentioned motion clearance and the characteristics of the shaft sleeve restricting the radial movement of the drive shaft, an irregular radial force is applied on the drive shaft when the teeth exert an irregular force on the bristles. This radial force will cause impact and collision between the drive shaft and the shaft sleeve. The impact and collision can cause large irregular noises. On the other hand, since the shaft sleeve constrains the radial movement of the drive shaft and supports the drive shaft, when a radial force is applied on the drive shaft, the drive shaft and the shaft sleeve come into contact, and the shaft sleeve supports the drive shaft to overcome the applied radial force on the drive shaft. Friction is created between the drive shaft and the sleeve shaft, and the friction will hinder the movement of the drive shaft, thereby consuming energy.

To sum up, comparing the support structure of the drive shaft that performs reciprocating rotary motion or reciprocating linear motion provided by the present invention with the existing support structure, on the one hand, because the drive shaft that performs reciprocating motion is coupled to the support structure without gap, the impact and collision on the support structure caused by the reciprocating motion of the drive shaft are avoided, and the noise is greatly reduced. On the other hand, the conversion energy loss between the elastic potential energy of the elastic member of the support structure and the driving kinetic energy of the drive shaft is very small, so it has the advantages of simple structure, low noise and small energy loss. In addition, the support structure is preferably a plastic part, which is low in cost and suitable for mass production.

What is claimed is:

1. A support structure, the support structure supports drive shaft (10, 40) that performs reciprocating motion comprising reciprocating linear motion or reciprocating rotary motion in an electric cleaning care appliance, the electric cleaning care appliance comprises a stationary upper device housing, a stationary lower device housing, and a head, at least a part of the drive shaft (10, 40) is located in the stationary lower device housing, under the action of drive force ($F_1$, $F_2$) of reciprocating linear motion or reciprocating rotary motion, the drive shaft (10, 40) reciprocates relative to the lower device housing along or about its longitudinal axis ($L_1$, $L_2$), a head driven by the drive shaft (10, 40) is also provided in the stationary upper device housing, the transverse axis ($L_3$, $L_4$) of the head is perpendicular to the longitudinal axis ($L_1$, $L_2$) of the drive shaft (10, 40), the support structure for supporting the drive shaft is provided in the lower device housing, wherein the support structure (20, 50) comprises an inner fixing ring (23, 53) of the support structure, at least one elastic member (22, 52) of the support structure and an outer fixing ring (21, 51) of the support structure, the inner fixing ring (23, 53) of the support structure is fastened on the drive shaft (10, 40) along a circumferential direction of the drive shaft (10, 40), the outer fixing ring (21, 51) of the support structure is directly or indirectly fastened on an inner wall of the lower device housing, the elastic member (22, 52) of the support structure is distributed between the outer fixing ring (21, 51) of the support structure and the inner fixing ring (23, 53) of the support structure, an outer end (A, C) of the elastic member (22, 52) of the support structure is fixedly coupled to the outer fixing rings (21, 51) of the support structure, an inner end (B, D) of the elastic member (22, 52) of the support structure is fixedly coupled to the inner fixing ring (23, 53) of the support structure, causing that the elastic member (22, 52) presents elastic bending deformation under the action of the relative movement of the drive shaft (10, 40), wherein, on a cross section of the elastic member (22, 52) of the support structure perpendicular to a radial direction of the drive shaft (10, 40) is distributed a width ($b_1$, $b_2$) along a direction perpendicular to the drive force ($F_1$, $F_2$), on a cross section of the elastic member (22, 52) of the support structure perpendicular to a radial direction of the drive shaft (10, 40) is distributed a thickness ($t_1$, $t_2$) along a direction parallel to the drive force ($F_1$, $F_2$), the width ($b_1$, $b_2$) of the elastic member (22, 52) of the support structure along the direction perpendicular to the drive force ($F_1$, $F_2$) is greater than three times the thickness ($t_1$, $t_2$) of the elastic member (22, 52) of the support structure along the direction parallel to the drive force ($F_1$, $F_2$), that is, $b_1>3t_1$, $b_2>3t_2$.

2. The support structure of claim 1, wherein the outer fixing ring (21, 51) of the support structure, the elastic member (22, 52) of the support structure and the inner fixing ring (23, 53) of the support structure are all made of plastic.

3. The support structure of claim 2, wherein the outer fixing ring (21, 51) of the support structure, the elastic member (22, 52) of the support structure and the inner fixing ring (23, 53) of the support structure are made of thermoplastic.

4. The support structure of claim 3, wherein the inner fixing ring (23, 53) of the support structure and the drive shaft (10, 40) that performs reciprocating motion are injection-molded as an integral piece.

5. The support structure of claim 2, wherein the inner fixing ring (23, 53) of the support structure and the drive shaft (10, 40) that performs reciprocating motion are injection-molded as an integral piece.

6. The support structure of claim 1, wherein the elastic member (22, 52) of the support structure is integrally coupled to the inner fixing rings (23, 53) and outer fixing rings (21, 51) of the support structure (20, 50).

7. The support structure of claim 1, wherein the elastic member (22, 52) of the support structure is arranged such that a length ($h_1$, $h_2$) of the elastic member (22, 52) of the support structure along the radial direction of the drive shaft (10, 40) is greater than three times a thickness ($t_1$, $t_2$) of the elastic member (22, 52) of the support structure in the direction parallel to the drive force ($F_1$, $F_2$) on the cross section perpendicular to the radial direction of the drive shaft, that is, $h_1>3t_1$, $h_2>3t_2$.

8. The support structure of claim 1, wherein the thickness ($t_1$, $t_2$) of the elastic member (22, 52) of the support structure in the direction parallel to the drive force ($F_1$, $F_2$) on the cross section perpendicular to the radial direction of the drive shaft is 0.1 mm-1.3 mm.

9. The support structure of claim 8, wherein the thickness ($t_1$, $t_2$) of the elastic member (22, 52) of the support structure in the direction parallel to the drive force ($F_1$, $F_2$) on the cross section perpendicular to the radial direction of the drive shaft is 0.2 mm-0.7 mm.

10. The support structure of claim 1, wherein the electric cleaning care appliance is an electric toothbrush or a dental irrigator, and the support structure is a linear motion support structure (20) for supporting a drive shaft (10) that performs reciprocating linear motion along the longitudinal axis ($L_1$).

11. The support structure of claim 10, wherein a distance between upper surfaces of the inner and outer fixing rings (21, 23) of the linear motion support structure (20) and the head is less than a distance between an upper edge of the elastic member (22) of the linear motion support structure and the head, or a distance between lower surfaces of the inner and outer fixing rings (21, 23) of the linear motion support structure (20) and the head is greater than a distance between a lower edge of the elastic member (22) of the linear motion support structure and the head, such that the combined linear motion support structure (20) is in a concave shape on at least one side of the upper and lower sides of the cross section parallel to the longitudinal axis ($L_1$) of the drive shaft (10) that performs reciprocating linear motion.

12. The support structure of claim 10, wherein under the action of the drive force ($F_1$) of reciprocating linear motion, a maximum motion amplitude of the drive shaft (10) that performs reciprocating linear motion along its longitudinal axis ($L_1$) is less than 3 mm.

13. The support structure of claim 12, wherein a maximum movement amplitude of the drive shaft (10) that performs reciprocating linear motion along its longitudinal axis ($L_1$) is 2 mm.

14. The support structure of claim 1, wherein the electric cleaning care appliance is an electric toothbrush, the support structure is a rotary motion support structure (50) for supporting the drive shaft (40) that performs reciprocating rotary motion about the longitudinal axis ($L_2$).

15. The support structure of claim 14, wherein under the action of the drive force ($F_2$) of reciprocating rotary motion, a maximum rotational angle amplitude of the drive shaft (40) that performs reciprocating rotary motion about its longitudinal axis ($L_2$) is less than 40 degree.

16. The support structure of claim 15, wherein the maximum rotary angular amplitude of the drive shaft (40) that performs reciprocating rotary motion about its longitudinal axis ($L_2$) is 25 degrees.

* * * * *